US012452278B1

United States Patent
Bjarnason et al.

(10) Patent No.: US 12,452,278 B1
(45) Date of Patent: Oct. 21, 2025

(54) SYSTEMS AND METHODS FOR SELECTIVE DECRYPTION OF ENCRYPTED DATA PACKETS

(71) Applicant: NetScout Systems, Inc., Westford, MA (US)

(72) Inventors: Steinthor Bjarnason, Fjerdingby (NO); Brian St. Pierre, Acworth, NH (US)

(73) Assignee: NetScout Systems, Inc., Westford, MA (US)

( * ) Notice: Subject to any disclaimer, the term of this patent is extended or adjusted under 35 U.S.C. 154(b) by 76 days.

(21) Appl. No.: 18/626,304

(22) Filed: Apr. 3, 2024

(51) Int. Cl.
H04L 9/40 (2022.01)
(52) U.S. Cl.
CPC ...... *H04L 63/1425* (2013.01); *H04L 63/1416* (2013.01); *H04L 63/1458* (2013.01)
(58) Field of Classification Search
CPC ............. H04L 63/1425; H04L 63/1416; H04L 63/1458
See application file for complete search history.

(56) References Cited

U.S. PATENT DOCUMENTS

| | | | | |
|---|---|---|---|---|
| 8,868,415 | B1* | 10/2014 | Rai | G10L 19/012 704/226 |
| 2009/0161874 | A1* | 6/2009 | Eun | H04L 63/061 380/277 |
| 2011/0078311 | A1* | 3/2011 | Nakashima | H04L 63/08 709/225 |
| 2014/0047237 | A1* | 2/2014 | Parrish | H04L 9/065 713/168 |
| 2016/0345179 | A1* | 11/2016 | Chen | H04J 3/0661 |
| 2019/0036965 | A1* | 1/2019 | Luo | H04L 63/1466 |
| 2019/0235951 | A1* | 8/2019 | Utsumi | G06F 11/108 |
| 2020/0120078 | A1* | 4/2020 | Mao | H04L 45/74 |
| 2021/0034790 | A1* | 2/2021 | Charles | H04L 9/0825 |
| 2021/0306366 | A1* | 9/2021 | Aggarwal | H04W 88/16 |
| 2022/0353736 | A1* | 11/2022 | Rivera Espinoza | H04L 67/566 |
| 2024/0007271 | A1* | 1/2024 | Inaba | H04L 9/0861 |
| 2024/0372900 | A1* | 11/2024 | Bulgarella | H04L 63/1475 |
| 2024/0385935 | A1* | 11/2024 | Sethi | G06F 16/1827 |
| 2025/0071142 | A1* | 2/2025 | Sethi | H04L 63/1458 |

* cited by examiner

*Primary Examiner* — Khalid M Almaghayreh
(74) *Attorney, Agent, or Firm* — Foley & Lardner LLP

(57) ABSTRACT

Systems and methods for network traffic monitoring are provided. A system may monitor a first plurality of encrypted data packet exchanges between a server and a plurality of network devices, determine one or more metric baselines corresponding to a plurality of metric types for communication between the server and the plurality of network devices, monitor a second plurality of encrypted data packet exchanges between the server and a second plurality of network devices, identify a set of encrypted data packet exchanges from the second plurality of encrypted data packet exchanges each having a duration exceeding a first threshold, determine an exchange metric for each of the plurality of metric types, identify one or more encrypted data packet exchanges having at least one exchange metric exceeding a metric baseline, and apply a tag to one or more network devices of the second plurality of network devices.

20 Claims, 9 Drawing Sheets

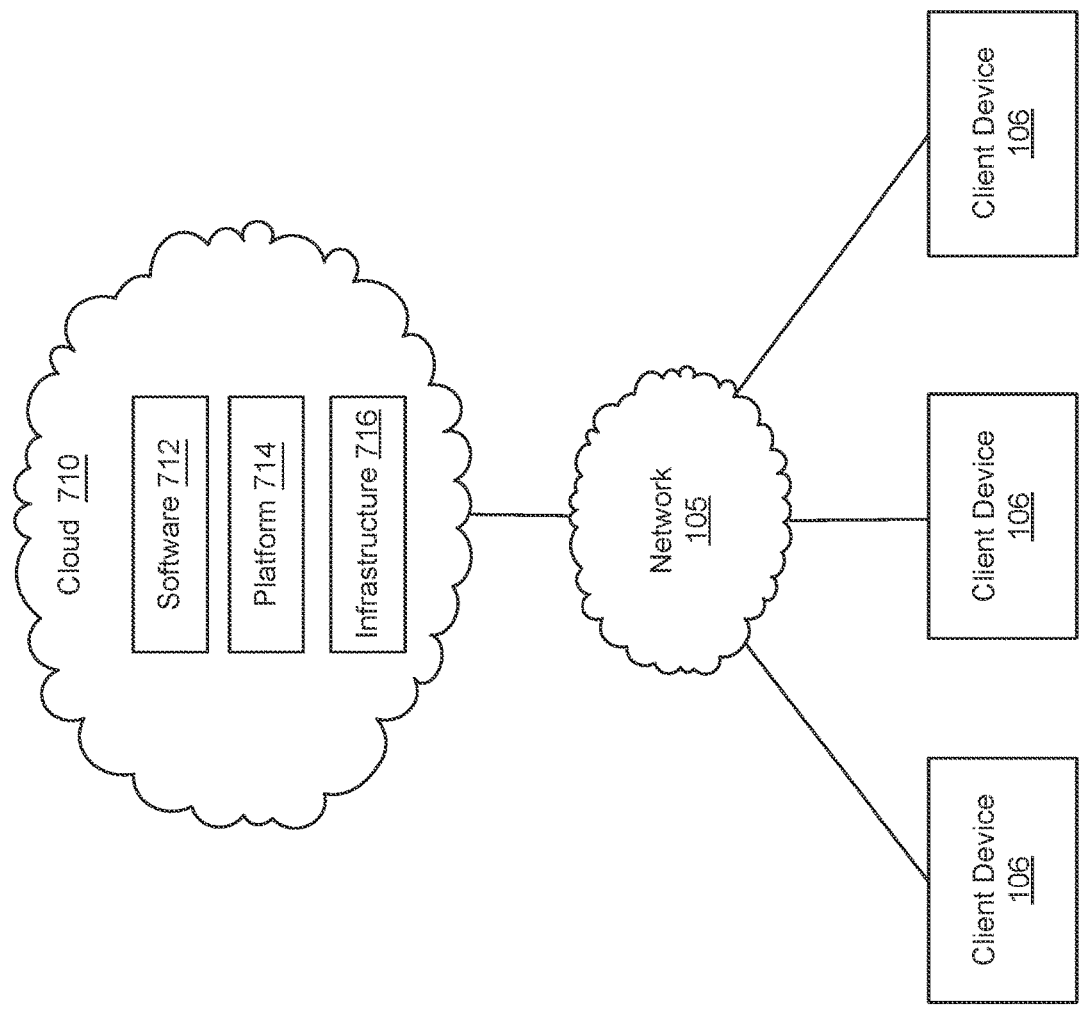

SYSTEMS AND METHODS FOR SELECTIVE DECRYPTION OF ENCRYPTED DATA PACKETS

BACKGROUND

Distributed denial of service (DDOS) attacks are used by malicious actors to deny access to a given network service. DDOS attacks can be sent via encrypted connections. As a result, the DDOS attacks may be difficult to detect.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 7B is a block diagram depicting a cloud computing environment including a client device in communication with cloud service providers.

DETAILED DESCRIPTION

Figure 1:
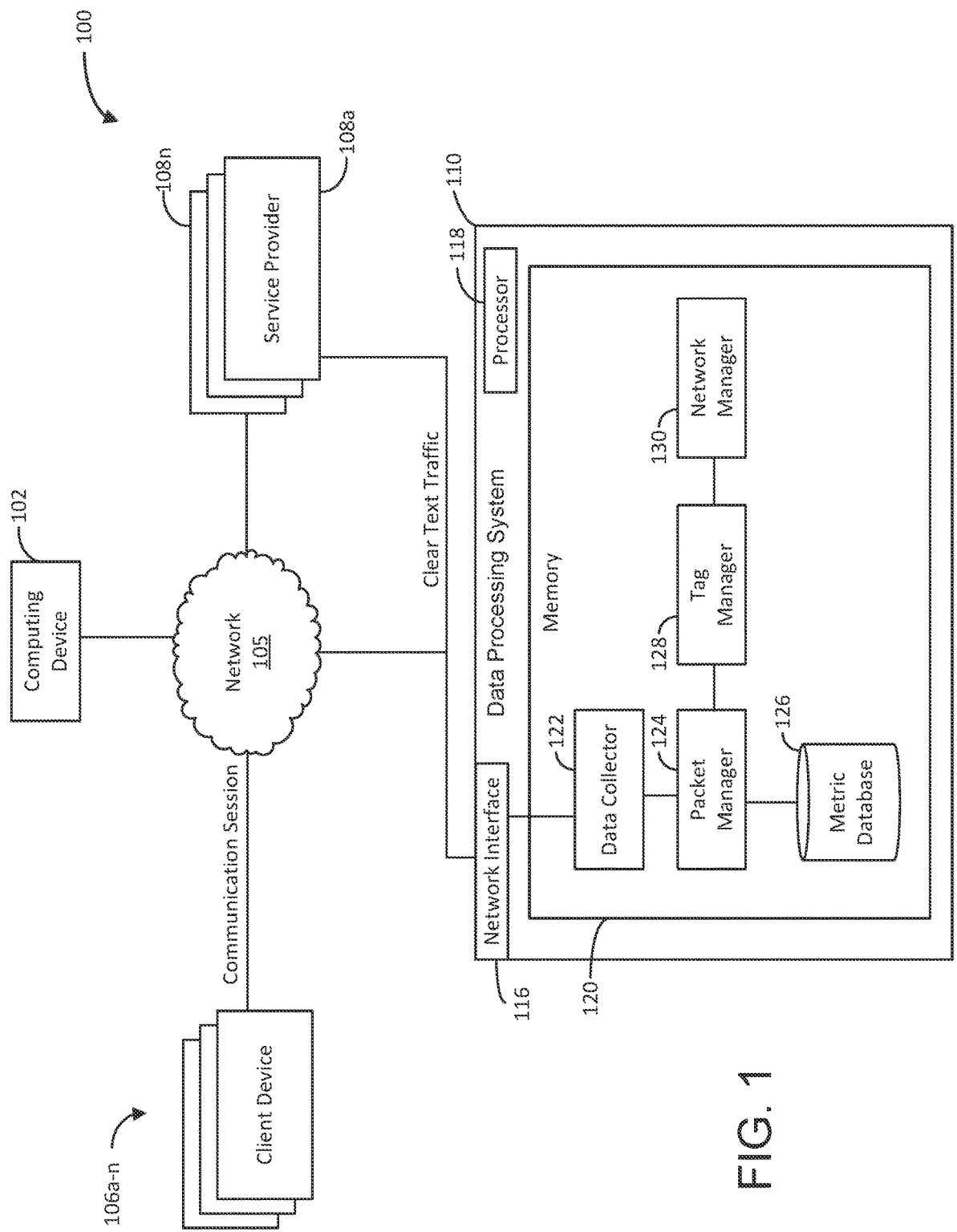
FIG. 1 is an illustration of a system for encrypted data packet exchange analysis, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Some systems may employ various techniques to detect network attacks. For example, as a monitoring system receives encrypted data packets, the monitoring system may decrypt each data packet and analyze the contents of the data packet to detect network attacks. The monitoring system may decrypt the data packets, perform an analysis on the decrypted data packets, and then encrypt the data packets again prior to forwarding the data packets to their destination. This process is computationally complex and time consuming as the decryption and then subsequent encryption of a previous encrypted data packets can double the amount of work and time to analyze each data packet. Additionally, in some cases, network traffic may be slowed down for encrypted data packets regardless of whether the network is under an attack because even these data packets may be decrypted and then encrypted once more.

The techniques described herein may overcome the aforementioned technical deficiencies. For instance, a computer may operate to selectively decrypt encrypted data packets when the computer detects a network attack. The computer may detect such network attacks based on network characteristics of the network under attack. For example, the computer may detect a potential DDOS attack based on a rapid or repetitive transmission of query repost from a single actor (e.g., an IP address, a network device, etc.). In another example, the computer may detect a potential DDOS attack of encrypted data packets based on a slow or lagged query request using various metric baselines. The computer may apply a flag to a computing device responsive to determining the computing device transmitted a malicious encrypted data packet or is otherwise associated with a DDOS attack. The computer can then decrypt the encrypted data packet and/or other encrypted data packets transmitted by the computing device based on the flag.

In some embodiments, the computer may create, generate, and/or compile metric baselines for networks that can be used to detect potential DDOS attacks. The computer can do so based on values for metrics that the computer determines during "peace time" or a time in which an attack has not been detected or indicated. For example, the computer may generate a data structure that includes average values for client packet sizes from monitored data packets. In another example, the computer may generate a data structure that includes average values for client inter-packet timing sizes. The computer can include averages for any type of metric for data packets transmitted across a network. The averages can be the baselines for the individual metrics.

The computer can use the baselines to detect DDOS network attacks by comparing metrics of newly monitored data packets to the corresponding baselines. For example, the computer may detect one or more DDOS network attacks based on one or more encrypted data packets having a client packet size (e.g., an average client packet size) that exceeds the determined baseline for the client packet size stored in the data structure. By using the baselines of different network metrics, the computer can detect DDOS attacks without analyzing the contents of the data packets, which can facilitate the computer detecting DDOS attacks from different data packets even when the contents of the data packets have been encrypted.

In one example, the computer may detect attempted network attacks such as rapidly sending a large number of queries (e.g., request flooding), sending slow queries (e.g., long lasting exchanges), rapidly sending large queries (e.g., HTTP POST), request flooding, and/or rapidly sending queries which result in large downloads. The computer may detect such network attacks based on the metric baselines for metrics that correspond to the different types of attacks.

In some embodiments, the computer may classify the encrypted data packet exchanges as either short-duration exchanges (e.g., sessions) or long-duration exchanges (e.g., sessions). Data packet exchanges can be or include a transmission of one or more data packets from a client to a server and, in some cases, vice-versa. For example, the computer may classify one or more encrypted data packet exchanges as short-duration exchanges when the one or more encrypted data packet exchanges are less than 500 milliseconds (e.g., duration of a session). As another example, the computer may classify one or more encrypted data packet exchanges as long-duration exchanges when the encrypted data packet exchanges exceed 500 milliseconds. In some embodiments, the computer may partition, divide, or otherwise separate the short-duration exchanges from the long-duration exchanges. For example, the computer may store the short-duration exchanges and/or information associated with the short-duration exchanges in a first data structure and the long-duration exchanges (and/or information associated with the long-duration exchanges) in a second data structure. Partitioning the data packet exchanges in this manner can aid the computer in detecting network attacks.

In some embodiments, the computer may detect malicious network devices and/or malicious Internet Protocol (IP) addresses based on metric baselines associated with the short-duration exchanges or the long-duration exchanges. The computer may use different baselines to detect attacks in short-duration exchanges compared with long-duration exchanges. For example, the computer may compile and/or determine given characteristics for short-duration exchanges or long-duration exchanges. The computer may detect malicious activity when given data packet exchanges and/or sessions include differences or discrepancies relative to the metric baselines. In one example, the computer may detect a given IP address as malicious when a number of short-duration exchanges associated with the given IP address exceeds a metric baseline. The number of short-duration exchanges exceeding the metric baseline may indicate request flooding.

The characteristics may refer to and/or include metric baselines such as packet count, packet sizes, inter-packet timing, or exchange duration. For example, the characteristics may include an average client packet size, an average server packet size, or average inter-packing timing for one or more given data packet exchanges.

FIG. 1 is an illustration of a system 100 for encrypted data packet exchange analysis, in accordance with an implementation. The system 100 may enable detection of DDOS attacks by detecting variances, differences, and/or discrepancies between metric baselines and characteristics of one or more encrypted data packet exchanges. In brief overview, the system 100 can include, access, or otherwise interface with one or more of a data processing system 110 (e.g., a probe, an inspection device), that receives and/or stores data packets transmitted via a network 105 between client devices 106a-n (hereinafter client device 106 or client devices 106) and service providers 108a-n. The service providers 108 can each include a set of one or more servers 702, depicted in FIG. 7A, or a data center 708. The client device 106 may be an example of a user equipment (UE) or another device that can access the network 105. The client device 106 can communicate with the service providers 108 to access a service (e.g., a website, an application, etc.). The client device 106, the service provider 108, and the data processing system 110 can communicate or interface with via the network 105 or directly.

Each of the computing device 102, the client devices 106, the service providers 108, and/or the data processing system 110 can include or utilize at least one processing unit or other logic device such as programmable logic array engine, or module configured to communicate with one another or other resources or databases. The components of the computing device 102, the client devices 106, the service providers 108, and/or the data processing system 110 can be separate components or a single component. In some embodiments, the data processing system 110 may be an intermediary device between the client devices 106 and the service providers 108. In some embodiments, the computing device 102 may be an external device (e.g., a security device, a monitoring device, etc.). In some embodiments, the computing device 102, the service provider 108, the data processing system 110, or any combination thereof, may share at least some components or be the same device. The system 100 and its components can include hardware elements, such as one or more processors, logic devices, or circuits.

The computing device 102, the client devices 106, the service providers 108, and/or the data processing system 110 can include or execute on one or more processors or computing devices (e.g., the computing device 703 depicted in FIG. 7C) and/or communicate via the network 105. The network 105 can include computer networks such as the Internet, local, wide, metro, or other area networks, intranets, satellite networks, and other communication networks such as voice or data mobile telephone networks. Via the network 105, the client device 106 can access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can communicate with the servers of the service providers 108 for data (e.g., a communication session including requests from the client devices 106 and responses from the service providers 108).

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), 3G, 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The service provider 108 can be a service provider that hosts different services or applications that can be accessed by computing devices, such as the computing device 102 and/or the client devices 106. The service provider 108 can be hosted by a third-party cloud service provider via a virtual environment, in some embodiments. The service provider 108 can be hosted in a public cloud, a co-location facility, or a private cloud, for example. The service provider 108 can be hosted in a private data center, or on one or more physical servers, virtual machines, or containers of an entity or customer. The service providers 108 may each be or include servers or computers configured to transmit or provide services across the network 105 to the client devices 106. The service providers 108 may transmit or provide such services upon receiving requests for the services from any of the client devices 106. The term "service" as used herein includes the supplying or providing of information over a network and is also referred to as a communications network service. Examples of services include 5G broadband services, any voice, data, or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, or any other SaaS application. The service provider 108 can be hosted or refer to cloud 710 depicted in FIG. 7B.

The client device 106 can establish communication sessions with the service providers 108 to receive data from the service providers 108. For example, a user associated with the client device 106 may request a service. Responsive to the request, a service provider 108 associated with the service may send requested data to the client device 106 in a communication session. In some cases, the request may be a bad request. For example, the request may be a nonexistent DNS query. The client devices 106 may establish communication sessions with the service providers 108 for any type of application or for any type of call.

The client device 106 can be located or deployed at any geographic location in the network environment depicted in FIG. 1. The client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 710 depicted in FIG. 7B). If the client device 106 is deployed in a cloud 710, the client device 106 can include or be referred to as a virtual client device or virtual machine. In the event the client device 106 is deployed in a cloud 710, the packets exchanged between the client device 106 and the service providers 108 can still be retrieved by the data processing system 110 from the network 105. The computing device 102 may be similar to client devices 106. In some cases, the client devices 106 and/or the data processing system 110 can be deployed in the cloud 710 on the same computing host in an infrastructure 716 (described below with respect to FIG. 7B).

The data processing system 110 may comprise one or more processors that are configured to obtain network data packets from the service providers 108 during a communication session between the client device 106 and the service providers 108. In some embodiments, the data processing system 110 may refer to and/or include a network monitoring device. The data processing system 110 may comprise a network interface 116, a processor 118, and/or memory 120. The data processing system 110 may communicate with any of the computing device 102, the client devices 106, and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a data collector 122, a packet manager 124, a metric database 126, a tag manager 128, and/or a network manager 130. The data processing system 110 may further include other components, managers, handlers, etc. to perform the techniques as described herein. In brief overview, the components 122-130 may obtain a network data packet associated with a communication session between the client device 106 and a network service provider (e.g., the service providers 108). The components 122-130 may determine whether the network data packet includes characteristics indicative of a malicious IP address.

The data collector 122 may comprise programmable instructions that, upon execution, cause the processor 118 to monitor one or more data packet exchanges. For example, the data collector 122 may monitor exchanges between the client device 106 and the service provider 108. In some embodiments, the data collector 122 may monitor encrypted data packet exchanges. For example, the data collector 122 may monitor encrypted data packet exchanges between one or more clients and a server. In some embodiments, a client may refer to a computer with a first IP address that initiates a session (e.g., a flow, communication, exchange, etc.) with a second computer having a second IP address.

The data collector 122 may obtain (e.g., receive, collect) data transmitted between the client devices 106 and the service providers 108 as part of a communication session. For example, the client device 106 may send a request for a service to the service provider 108. The service provider 108 may send a response to provide the service to the client device 106. The data collector 122 may receive the request from the service provider 108. In some cases, the response may be unencrypted (e.g., clear text traffic). For example, the data collector 122 may obtain the response before an encryption device applies an encryption process to the response. The request may be associated with a normal request for the service, or the request may be associated with a malicious attack.

The data collector 122 may communicate or provide the encrypted data packets to the packet manager 124. For example, the data collector 122 may provide information corresponding to the encrypted data packets to the packet manager 124. In some embodiments, the data collector 122 may forward the encrypted data packets to the packet manager 124.

The packet manager 124 may comprise programmable instructions that, upon execution, cause the processor 118 to determine one or more metric baselines. For example, the packet manager 124 may determine metric baselines for the various encrypted data packets obtained by the data collector 122. As another example, the packet manager 124 may determine values such as average packet size, average inter-packet timing, and/or various combinations. The metric baselines may correspond to one or more metric types. For example, the metric baseline may correspond to packet size (e.g., a first metric type) or inter-packet timing (e.g., second metric type). As another example, the metric baselines may correspond to client metrics (e.g., a first metric type) or server metrics (e.g., a second metric type).

The metric baselines may refer to or include average values, statistics, and/or characteristics. For example, the metric baselines may include data packet sizes associated with one or more encrypted data packet exchanges. As another example, the metric baselines may include inter-packet timings associated with one or more encrypted data packet exchanges. In some embodiments, the packet manager 124 may determine metric baselines for one or more client devices 106. For example, the packet manager 124 may determine a first metric baseline for a first client device 106 based on data packets transmitted by the first client device 106 to the service provider 108. As another example, the packet manager 124 may determine a second metric baseline for a second client device 106 based on data packets that the second client device 106 transmits to the service provider. The packet manager 124 may store, locate, keep, or maintain the metric baselines in the metric database 126.

As an example, the packet manager 124 may determine (e.g., measure, calculate, predict, etc.), for a given client and/or a given server at least one of an average client packet sizes and standard deviation, an average client inter-packet timing sizes and standard deviation, an average server response packet sizes and standard deviation, or an average server response inter-packet timing and standard deviation. The packet manager 124 may determine these various metric baselines to assist with detecting encrypted attacks (e.g., malicious IP addresses). In some embodiments, the metric baselines may be determined and/or generated over a predetermined amount of time. For example, the metric baselines may be determined based on a number of encrypted data packet exchanges that occurred within a five second time window (e.g., an amount of time).

The packet manager 124 may detect and/or identify data packet exchanges as either short-duration exchanges (e.g., sessions, flows, etc.) or long-duration exchanges. In some embodiments, one or more data packet exchanges that have a duration less than or equal to a threshold (e.g., a predetermined threshold) may be considered short-duration packet exchanges. In some embodiments, one or more data packet exchanges that have a duration greater than a threshold may be long-duration exchanges. For example, data packet exchanges that are less than 500 milliseconds may be considered short-duration exchanges. Data packet exchanges that are greater than 500 milliseconds may be considered long-duration exchanges.

The packet manager 124 may identify one or more encrypted data packet exchanges as one or more short-duration encrypted data packet exchanges. For example, the packet manager 124 may identify a first encrypted data packet exchange and a second encrypted data packet exchange as short-duration encrypted data packet exchanges. In some embodiments, the packet manager 124 may identify the encrypted data packet exchanges as short-duration encrypted data packet exchanges based on a completion time or transmission time associated with the exchanges. For example, the packet manager 124 may determine an amount of time that a client communicates with a server.

In some embodiments, packet manager 124 can use counters for the long-duration counters exchanges and/or the short-duration exchanges to detect network attacks. For example, the packet manager 124 may maintain and increment or update a counter for a network device for each short-duration encrypted data packet exchange that the packet manager 124 detects for the network device and a server (e.g., the service provider 108) and a separate counter for the network device for each long-duration encrypted data packet exchange that the packet manager 124 detects for the network device and the server. The packet manager 124 can increment or update such counters for all of the network device's communications with other computers. In some embodiments, the packet manager 124 can maintain and increment or update such counters for communications that the network device has with other computers individually. The packet manager 124 can compare the counts of the counters to a threshold (e.g., a predetermined threshold) to detect network attacks. For example, the packet manager 124 may determine that a client that is sending a number of short-duration exchanges above a threshold may indicate that the client is partaking in request flooding (e.g., sending repetitive requests).

The packet manager 124 may update the metric database 126 to reflect and/or include an indication of a number of short-duration encrypted data packet exchanges identified. For example, the packet manager 124 may update and/or generate counter that reflects a count of the number of short-duration encrypted data packet exchanges the packet manager 124 identified.

The packet manager 124 may track, determine, calculate, or measure at least one of packet counts (e.g., number of packets), packet size (e.g., amount of data included in the data packet, amount of data requested by the data packet, etc.), inter-packet timing, or exchange duration for one or more IP addresses, clients, or servers. For example, data packet exchanges may correspond to a 5-tuple. The 5-tuple may include a source IP address, a destination IP address, an IP protocol, a source port, and a destination port, for example, of a data packet transmitted by a particular computing device communicating with a server or another computing device. The packet manager 124 may update the packet count (e.g., number of packets received) for a 5-tuple responsive to receipt of a data packet having the 5-tuple. The packet manager 124 may also determine a packet size for a given data packet (e.g., a size and/or an amount of information included and/or required by the given data packet). The packet manager can store data regarding different 5-tuples (e.g., data packet exchanges) in a database (e.g., the metric database 126).

The packet manager 124 may sort, organize, or store the metric baselines according to short-duration metrics or long-duration metrics. For example, the packet manager 124 may store metric baselines corresponding to short-duration exchanges as a first dataset and metric baselines corresponding to long-duration exchanges as a second dataset. The packet manager 124 may continuously and/or semi-continuously generate metric baselines to determine and/or update baseline network traffic exchanges. Subsequent to the packet manager 124 generating metric baselines, the data collector 122 may collect encrypted data packet exchanges to which the packet manager 124 can compare the metric baselines. Stated otherwise, the packet manager 124 may generate metric baselines at one or more first points in time and the packet manager 124 may compare metrics generated for one or more characteristics subsequent encrypted data packet exchanges with the metric baselines to detect attempted network attacks.

The data collector 122 may monitor one or more data packet exchanges subsequent to determining the metric baselines. In some embodiments, the data collector 122 may monitor the data packet exchanges subsequent to the packet manager 124 determining the metric baselines. For example, the data collector 122 may monitor exchanges, sessions, flows, or communications between the client device 106 and the service provider 108. The data collector 122 may monitor exchanges after the packet manager 124 determines the metric baselines. In some embodiments, the data collector 122 may continuously and/or semi-continuously forward and/or communicate the data packet exchanges to the packet manager 124.

The packet manager 124 may determine exchange metrics for one or more data packet exchanges. For example, the packet manager 124 may determine a packet size and/or an inter-packeting timing for the data packet exchanges. The packet manager 124 can determine the exchange metrics for each individual data packet exchange and/or across data packet exchanges for a particular client device or server. The packet manager 124 may query and/or retrieve the metric baselines from the metric database 126.

The packet manager 124 may can determine metrics for data packet exchanges based on the durations of the data packet exchanges. For example, the packet manager 124 may identify data packet exchanges that have a duration that exceeds a threshold (e.g., identify long-duration exchanges) or that have a duration that is less than the threshold (e.g., identify short-duration exchanges). The packet manager 124 can determine metrics for the data packet exchanges for a client device with durations that exceed the threshold and/or metrics for the data packet exchanges for the client device with durations that are less than the threshold. In doing so, the packet manager 124 can determine metrics for separate types of data packet exchanges and avoid biasing metrics for data packet exchanges for one type of duration (e.g., short or long) with data of data packet exchanges of another type of duration.

The packet manager 124 may identify one or more sets of encrypted data packet exchanges. For example, the packet manager 124 may identify a set of encrypted data packet exchanges that correspond to a given network device (e.g., a given client device 106). The packet manager 124 may determine one or more exchange metrics associated with the set of encrypted data packet exchanges. For example, the packet manager 124 may determine an average packet size and an average inter-packet timing for the set of encrypted data packet exchanges.

The packet manager 124 may retrieve one or more sets of information to use to detect network attacks from the metric database 126. For example, the packet manager 124 may retrieve information stored in the metric database 126. In some embodiments, the packet manager 124 may retrieve information that corresponds to one or more network devices (e.g., client devices 106). For example, the packet manager 124 may retrieve metric baselines that correspond to a given client device 106 from the metric database 126. In some embodiments, the packet manager 124 may retrieve the sets of information by querying and/or interfacing with the metric database 126.

The packet manager 124 may identify one or more data packet exchanges with a metric that exceeds a corresponding metric baseline (e.g., a baseline for the same type of metric). For example, the packet manager 124 may identify one or more data packet exchanges that have a packet size that is larger than an average packet value baseline stored in the metric database 126. As another example, the packet manager 124 may identify one or more data packet exchanges associated with a given IP address that exceeds an average packet count baseline. The packet manager 124 may provide an indication of IP addresses associates with the data packet exchanges to the tag manager 128.

The tag manager 128 may comprise programmable instructions that, upon execution, cause the processor 118 to apply one or more tags to network devices. In some embodiments, the tag manager 128 may apply one or more tags to network devices by updating or storing a flag, in a database (e.g., the metric database 126), that indicates that the one or more network devices (e.g., IP addresses of the one or more network devices) have been tagged. For example, the tag manager 128 may apply tags to a given client device 106 in the database.

In some embodiments, the tag manager 128 may apply tags to network devices associated with the data packet exchanges identified by the packet manager 124. For example, the packet manager 124 may flag one or more data packet exchanges for which a metric exceeds a corresponding metric baseline (e.g., a short duration metric baseline or a long duration metric baseline, depending on whether the one or more data packet exchanges are short duration exchanges or long duration exchanges) and the tag manager 128 may flag one or more network devices (e.g., IP addresses) associated with the data packet exchanges.

In some embodiments, the tag manager 128 may apply one or more tags based on the exchange metrics determined by the packet manager 124. For example, the tag manager 128 may apply a tag to a given network device based on the exchange metrics for a given set of encrypted data packet exchanges exceeding one or more metric baselines. The exchange metrics may include a number of short-duration encrypted data packet exchanges included in the set of encrypted data packet exchanges. In this example, the number of short-duration encrypted data packet exchanges may exceed a metric baseline for short-duration encrypted data packet exchanges.

The network manager 130 may comprise programmable instructions that, upon execution, cause the processor 118 to transmit one or more signals (e.g., messages). For example, the network manager 130 may transmit signals to the computing device 102. In some embodiments, the network manager 130 may transmit one or more signals to cause the computing device 102 to decrypt one or more encrypted data packet exchanges. For example, the computing device 102 may be active proxy that is positioned between the client devices 106 and the service providers 108 (e.g., a gateway). To continue this example, the computing device 102 may be decrypted one or more encrypted data packet exchanges based on signals provided by the network manager 130. In some embodiments, the network manager 130 may flag and/or identify one or more encrypted data packets and provide, via one or more signals, indications of the encrypted data packets to computing device 102. The computing device 102 may decrypt the encrypted data packets responsive to receipt of the indications from the network manager 130.

In some embodiments, the network manager 130 may decrypt one or more encrypted data packet exchanges. For example, the network manager 130 may decrypt encrypted data packet exchanges that are associated with (e.g., either sent by or sent to) a network device tagged by the tag manager 128. In some embodiments, the network manager 130 may execute and/or perform one more decryption techniques. The network manager 130 may decrypt the encrypted data packet exchanges to identify information included in the encrypted data packet exchanges. For example, the network manager 130 may identify a given attack attempted by the network device responsive to decryption of the encrypted data packet exchanges.

The network manager 130 may prevent subsequent data packet exchanges between the service provider 108 and one or more client devices 106. For example, the network manager 130 may prevent subsequent data packet exchanges between a server and one or more network devices (e.g., one or more devices identified as being malicious or potentially malicious) by communicating, using network protocols such as BGP Flowspec, and/or Openflow, with network elements of the network 105, such as routers. As another example, the network manager 130 may prevent subsequent data packet exchanges responsive to decryption of one or more encrypted data packet exchanges or responsive to determining a network device is malicious or potentially malicious (e.g., without decrypting the data packets (e.g., the encrypted data packets)). To continue this example, the network manager 130 may communicate with and/or interface with the data collector 122 to provide an indication that the data collector 122 block (e.g., prevent) subsequent data packet exchanges between the server the network devices tagged by the tag manager 128.

In some embodiments, the packet manager 124 may detect a potentially malicious client device based on the client device having similar metrics to other client devices that the data processing system 110 identified as being malicious or potentially malicious. For example, the packet manager 124 may compare exchange metrics of one or more encrypted data packet exchanges associated with a tagged network device with one or more exchange metrics of one or more second encrypted data packet exchanges associated with one or more second network devices. In doing so, the packet manager 124 may compare the exchange metrics to identify one or more similarities and/or differences. The packet manager 124 may identify one or more subsequent network devices as malicious based on the comparison of the exchange metrics (e.g., responsive to determining the metrics are similar within a threshold of each other). For example, the packet manager 124 may use cohort analysis to identify patterns which are similar or identical for groups of malicious clients. DDOS attacks are often launched by botnets, and as such the packet manager 124 can use cohort analysis to identify other botnet members. The packet manager 124 can block botnet members from establishing a connection with a server the botnet members are attacking and/or block the botnet members from establishing any connections across the network responsive to identification of the botnet member as malicious.

The packet manager 124 can detect a flooding attack based on the amount of time that elapses between encrypted data packet exchanges. For example, the packet manager 124 may determine an amount time elapsed between a first encrypted data packet exchange and a second encrypted data packet exchange. To continue this example, the first encrypted data packet exchange and the second encrypted data packet exchange may be transmitted by a first client device 106. As another example, a first client device 106 may transmit a first encrypted data packet exchange and a second client device 106 may transmit a second encrypted data packet exchange. The packet manager 124 may determine an amount of time between transmission of the first encrypted data packet and the second encrypted data packet.

The packet manager 124 may detect that an amount of time elapsed between transmission of a first encrypted data packet exchange and a second encrypted data packet exchange exceeds (or is less than, depending on the configuration) a predetermined threshold. The packet manager 124 may detect that the first client device 106 is attempting request flooding responsive to the detection. The packet manager 124 may provide an indication an identification (e.g., IP address) of the first client device 106 to the tag manager 128.

The tag manager 128 can apply a tag to one or more client devices identified by the packet manager 124. For example, the tag manager 128 may apply a tag to a client device 106 that appeared to be attempting request flooding. To continue this example, the client device 106 may have transmitted one or more encrypted data packet exchanges within a given amount of time that exceeded one or more threshold. In some embodiments, the tag manager 128 may apply the tag to the client device to flag the client device as malicious.

Figure 2:
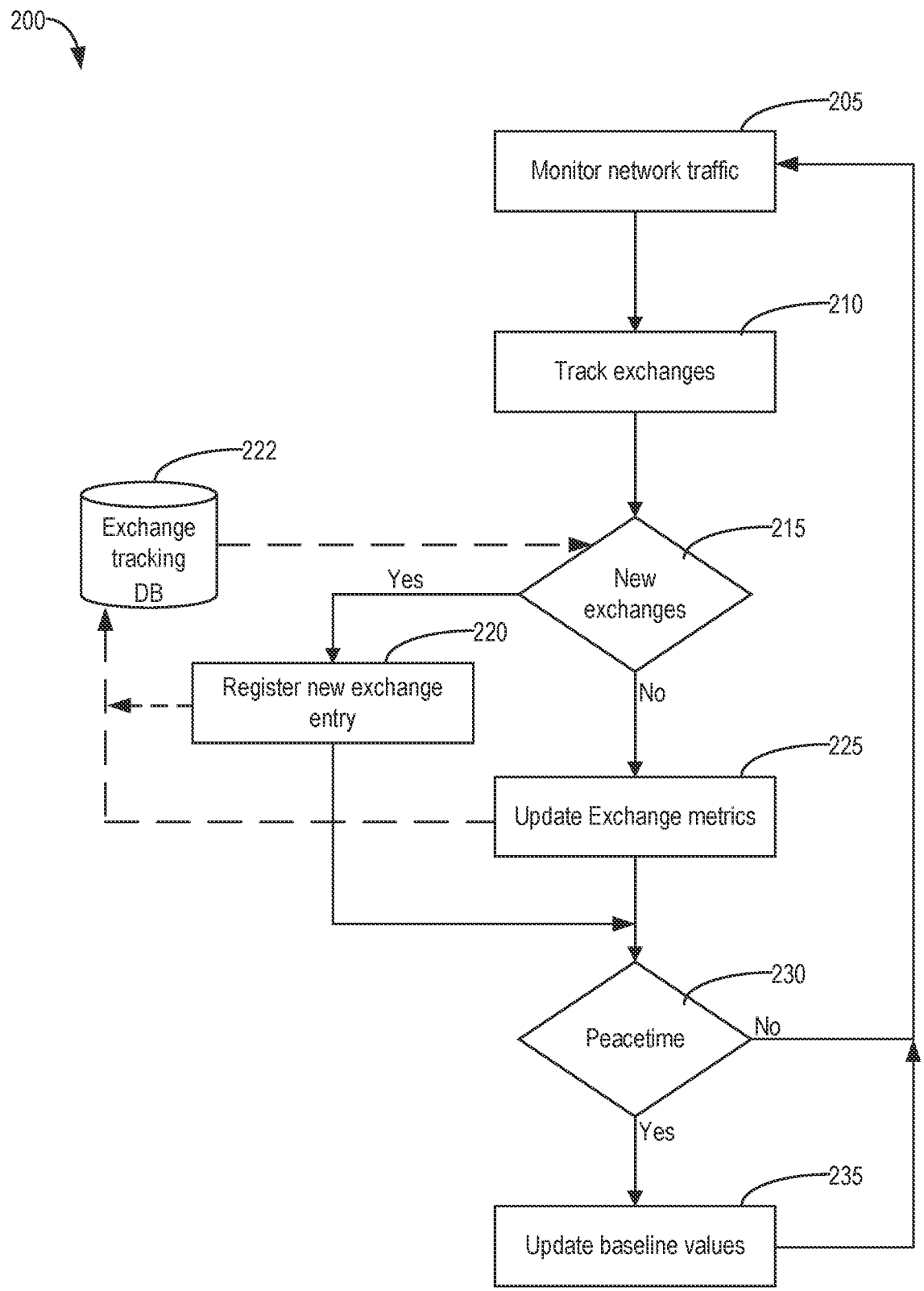
FIG. 2 is an illustration of a flow diagram of a process for encrypted data packet exchange analysis.

FIG. 2 is an illustration of a flow diagram of a process 200 for encrypted data packet exchange analysis, in accordance with an implementation. The process 200 can be performed by a data processing system (the data processing system 110, shown and described with reference to FIG. 1). The process 200 may include more or fewer operations and the operations may be performed in any order. Performance of the process 200 may enable the data processing system to detect one or more network attacks included in encrypted data packet exchanges.

At operation 205, the data processing system can monitor network traffic. For example, the data processing system can monitor network traffic between one or more network devices and a server. The network devices can include the client devices 106. The server can include the service provider 108. The data processing system can monitor network traffic by collecting or obtaining the encrypted data packet exchanges and/or information associated with the encrypted data packet exchanges. For example, the data processing system can serve as a gateway between the network devices and the server.

At operation 210, the data processing system tracks exchanges. For example, the data processing system can track each 5-tuple that is included and/or transmitted in one or more encrypted data packet exchanges. The 5-tuples can be included in data packets transmitted by the client and/or the server. The 5-tuples may include information pertaining to a given exchange, such as source IP address, destination IP address, IP protocol, source port, and destination port.

In operation 210, the data processing system can track and/or determine at least one of packet count, packet size, inter-packet timing, and/or exchange duration. The data processing system can also partition, organize, and/or arranged the exchange metrics according to network device. For example, the data processing system can organize exchange metrics for a first network device and exchange metrics for a second network device into separate rows of a table or database.

At operation 215, the data processing system determines whether the exchanges, tracked in operation 210, include new exchanges. For example, the data processing system can determine that one or more exchanges correspond to a new network device (e.g., a device without any exchange metrics). The process 200 can proceed to operation 220 responsive to a determination that the tracked exchanges included new exchanges. The process 200 can proceed to operation 225 responsive to a determination that the tracked exchanges did not include new exchanges.

At operation 220, the data processing system can register new data packet exchange entries. For example, the data processing system can store and/or add exchange metrics associated with the new exchanges in an exchange tracking database 222 (e.g., the metric database 126). The data processing system can store exchange metrics according to network device. For example, the data processing system can apply a tag to the exchange metrics to identify a network device associated with the exchange metrics. The data processing system can also identify the exchange metrics based on network device. For example, the data processing system can tag or identify given exchange metrics that correspond to given network devices.

At operation 225, the data processing system can update exchange metrics. For example, the data processing system can determine an average packet size for given data packet exchanges transmitted by a given network device has changed. In this example, the data processing system can update the exchange tracking database 222 to reflect the change in average packet size. As another example, the data processing system can update exchange metrics when the data processing system detects changes in values currently stored or located in the exchange tracking database 222.

At operation 230, the data processing system can determine if a network is in peacetime. For example, the data processing system can determine if there have been any detected network attacks, such as based on whether a user has provided an input indicating an attack or whether the data processing system has detected an attack by applying one or more rules to data packets transmitted across the network, and/or whether the data processing system has received a message indicating an attack. The process 200 can proceed to operation 205 responsive to a determination that at least one network attack was detected. The process 200 can proceed to operation 235 responsive to a determination that the network is in peacetime.

At operation 235, the data processing system can update baseline values. For example, the data processing system can aggregate, average, combine, or otherwise standardize the exchange metrics to generate a landscape view (e.g., what does network activity look like). As another example, the data processing system can determine average values (e.g., metric baselines) for packet count, packet size, inter-packet timing, and/or packet duration based on the exchange metrics from operation 225. As even another example, the data processing system can insert and/or include the baseline values into one or more databases (e.g., the exchange tracking database 222, memory 120, etc.) The process 200 can proceed to operation 205 responsive to updating and/or generating the baseline values.

Figure 3:
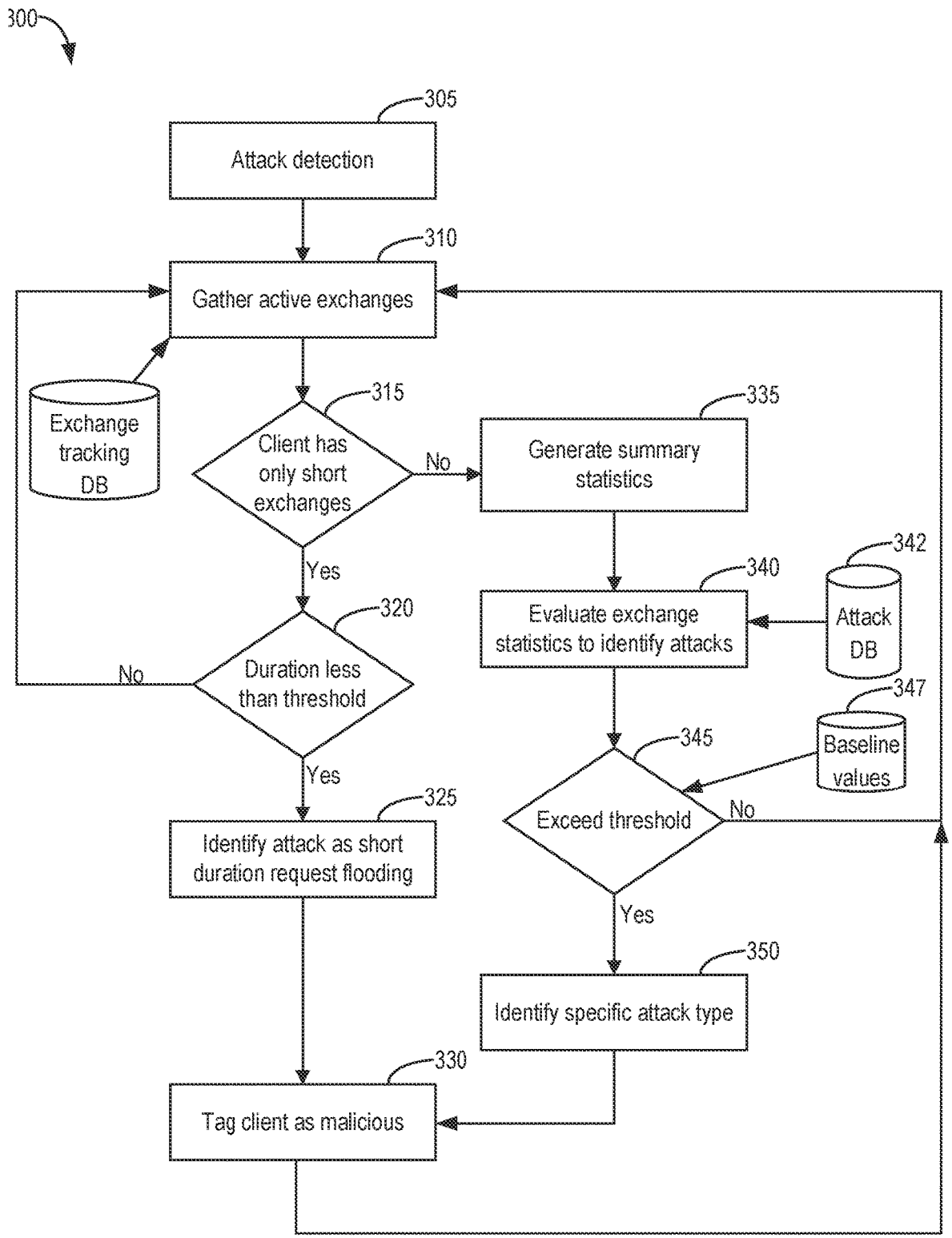
FIG. 3 is an illustration of a flow diagram of a process for encrypted data packet exchange analysis.

FIG. 3 is an illustration of a flow diagram of a process 300 for encrypted data packet exchange analysis, in accordance with an implementation. The process 300 can be performed by a data processing system (the data processing system 110, shown and described with reference to FIG. 1). The process 300 may include more or fewer operations and the operations may be performed in any order. Performance of the process 300 may enable the data processing system to detect one or more network attacks included in encrypted data packet exchanges.

At operation 305, the data processing system can detect a network attack. For example, the data processing system can detect an interruption in the network. As another example, the data processing system can detect a network attack based on traffic patterns across the network.

At operation 310, the data processing system can gather active exchanges. For example, the data processing system can query an exchange tracking database 322 (e.g., the metric database 126) to receive exchange metrics for one or more network devices. As another example, the data processing system can receive information that indicates exchanges for one or more network devices. The data processing system can gather active exchanges for a given network and/or for a given network device. Stated otherwise, the data processing system can gather exchanges according to network device and/or according to a network.

At operation 315, the data processing system can determine if a given client has only short exchanges. For example, the data processing system may determine a number of short-duration packet exchanges and compare the number to a threshold (e.g., 50 short-duration packet exchanges, 100 short-duration packet exchanges, 10 short-duration packet exchanges, etc.). To continue this example, the data processing system can determine that a client (e.g., a network device, IP address, etc.) has only short-duration exchanges based on the number of short-duration exchanges exceeding the threshold and based on there being no long-duration exchanges. As another example, the data processing system can evaluate the active exchanges to determine whether a network device is only sending short-duration data packet exchanges (e.g., encrypted data packet exchanges). To continue this example, a predetermined threshold and/or a predetermined amount of time can determine if a data packet exchange is a short-duration data packet exchange or a long-duration data packet exchange. In this example, the predetermined threshold can be 500 milliseconds and as such exchanges are short-duration exchanges if they are less than 500 milliseconds and exchanges are long-duration exchanges if there are larger than 500 milliseconds. As another example, the data processing system can detect that the active exchange information includes only short-duration packet exchange counts (e.g., only short-duration exchanges have been transmitted). The process 300 can proceed to operation 320 responsive to a determination that exchange metrics for a network device includes only short-duration exchanges. The process 300 can proceed to operation 335 responsive to a determination that exchange metrics for a network device include at least one long-duration exchange.

At operation 320, the data processing system can determine a duration amount for given data packet exchanges and whether the duration amount is less than a threshold. For example, the threshold may be 200 milliseconds. The data processing system can determine if duration amounts for packet exchanges are less than the threshold (e.g., is the duration of a given data packet exchange less than the threshold). The process 300 can proceed to operation 310 responsive to a determination that the duration of exchanges is larger than the threshold.

Responsive to determining that the duration of the exchanges is less than the threshold, at operation 325, the data processing system identifies one or more attacks. The data processing system can identify the one or more attacks as short duration request flooding attacks. For example, the data processing system can identify that a given network device is repeatedly sending short-duration requests to flood and/or dilute the network. As another example, the data processing system can identify that a given network device is sending a repetitive request.

At operation 330, the data processing system can tag one or more clients as malicious. For example, the data processing system can tag the network device associated with the network attack identified in operation 325. As another example, the data processing system can tag one or more network devices that are identified as attempting one or more network attacks.

Responsive to determining at operation 315 that the client does not only have short duration encrypted data packet exchanges, at operation 335, the data processing system can generate summary statistics for all active exchanges (e.g., both short-duration data packet exchanges and long-duration data packet exchanges). For example, the data processing system can summarize exchange metrics associated with data packet exchanges that were identifies as long-duration data packet exchanges. As another example, the data processing system can generate summaries of packet counts, packet size, inter-packing timing, and/or exchange duration. The summarized exchange metrics can include a mean and/or a standard deviation for one or more exchange metrics, such as a mean and a standard deviation for packet size, a mean and a standard deviation for inter-packet timing, and/or various other exchange metrics.

At operation 340, the data processing system can evaluate the exchange statistics to identify attacks. For example, the data processing system can evaluate the exchange statistics to identify average values for various metric baselines. As another example, the data processing system can evaluate the exchange statistics to identify one or more data packet exchanges. The exchange statistics can identify given data packet exchanges as either short-duration exchanges and/or long-duration exchanges. The data processing can determine or identify the exchange statistics for data packets of data packet exchanges stored in an attack database 342. The attack database 342 can be the same as or similar to the exchange tracking database 322.

At operation 345, the data processing system can determine if one or more exchange statistics exceed a threshold. For example, the data processing system can determine if one or more exchange statistics are larger than a threshold. As another example, the data processing system can determine if one or more exchange statistics are less than a threshold. In some embodiments, the threshold may include at least one metric baselines 347 as described herein. The process 300 can proceed to operation 310 responsive to a determination that the exceed statistics do not exceed one or more thresholds. The process 300 can proceed to operation 350, responsive to a determination that the exchange statistics exceed one or more thresholds.

At operation 350, the data processing system can identify one or more specific attack types. For example, the data processing system can identify attack types based on the exchange statistics that exceed one or more thresholds from operation 345. As another example, the data processing system can create one or more database entries to identify the attack types.

As an example, the data processing system can detect that a mean client packet size is below a threshold and a client inter-packet timing is below a threshold. The data processing system can create a database entry with this client marked as malicious due to repeated request flooding. As another example, the data processing system can detect that a server packet size standard deviation is below a threshold and that a mean server packet size is below a threshold. To continue this example, the data processing system can create a database entry with this client marked as malicious due to repeated requests for the same content. As another example, the data processing system can detect that a server packet size standard deviation is below a threshold and that a mean server packet size is above a threshold. To continue this example, the data processing system can create a database entry with this client marked as malicious due to high-bandwidth request flooding.

As another example, the data processing system can detect that a mean client inter-packet timing is above a threshold. To continue this example, the data processing system can create a database entry with this client marked as malicious due to slow session abuse. As another example, the data processing system can detect that a mean server inter-packet timing is below a threshold and that a server inter-packet standard deviation is below a threshold. To continue this example, the data processing system can create a database entry with this client marked as malicious due to high-bandwidth request abuse.

Figure 4:
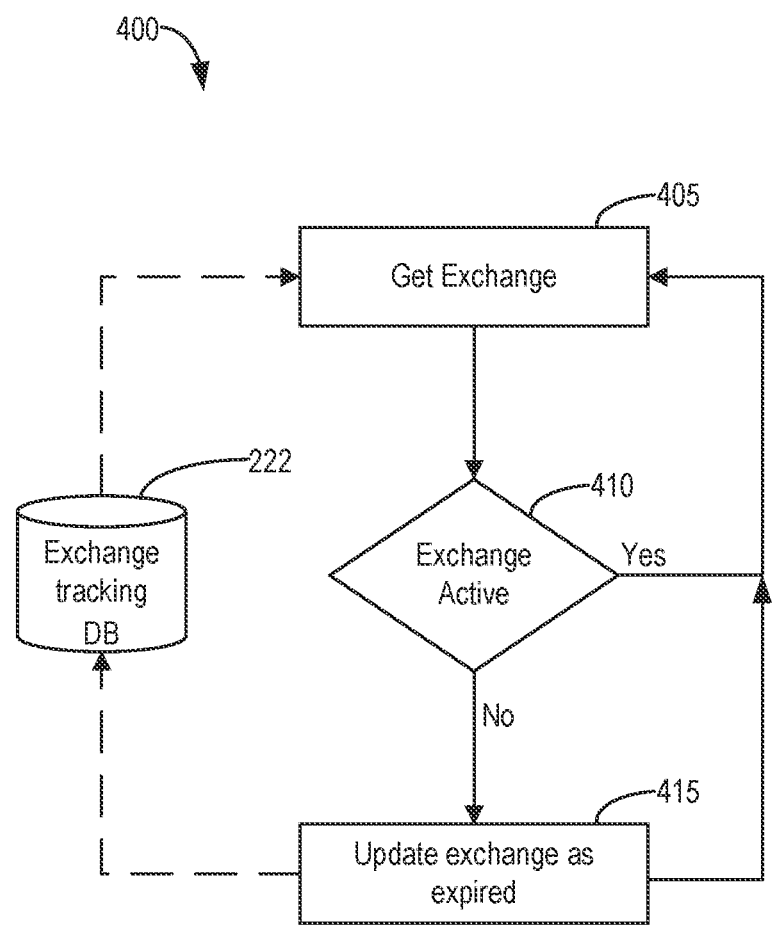
FIG. 4 is an illustration of a flow diagram of a process for encrypted data packet exchange analysis.

FIG. 4 is an illustration of a flow diagram of a process 400 for encrypted data packet exchange analysis, in accordance with an implementation. The process 400 can be performed by a data processing system (the data processing system 110, shown and described with reference to FIG. 1). The process 400 may include more or fewer operations and the operations may be performed in any order. Performance of the process 400 may enable the data processing system to detect one or more network attacks included in encrypted data packet exchanges.

At operation 405, the data processing system gets one or more exchanges. For example, the data processing system can query the exchange tracking database 222 to review and/or analyze the status of one or more exchanges (e.g., active, expired, etc.). As another example, the data processing system can continuously and/or semi-continuously interface with the exchange tracking database 222 to monitor the status of the exchanges. As another example, the data processing system can determine if a client and/or server are still communicating with one another, based on information stored in the exchange tracking database 222. In some embodiments, operation 405 may be repeated, reinitiated, and/or executed at one or more time intervals and/or amounts of time. For example, operation 405 may be repeated every 300 seconds. In some embodiments, operation 410 may be repeated based on network devices. For example, at operation 405, the data processing system may get and/or receive one or more exchanges that correspond to a given network device.

At operation 410, the data processing system determines if the exchanges are active. For example, the data processing system can determine that exchange is active based on information stored in the exchange tracking database 222. To continue this example, the information may indicate that a client is still communicating with the server. The process 400 can proceed to operation 405 responsive to a determination that the exchanges are active. For example, the data processing system can determine that the server is still executing commands based on various exchanges. The process 400 can proceed to operation 415 responsive to a determination that the exchanges are expired.

At operation 415, the data processing system updates the exchanges as expired. For example, the data processing system can update the exchange tracking database 222 to reflect the exchanges as expired. As another example, the data processing system can update the exchange metrics to reflect a duration time for the exchanges given that the exchanges are expired. The process 400 can proceed to operation 405 responsive to updating the exchanges as expired. For example, the data processing system can query the exchange tracking database 222 for the next exchange included in a queue, a stack, and/or a cache.

Figure 5:
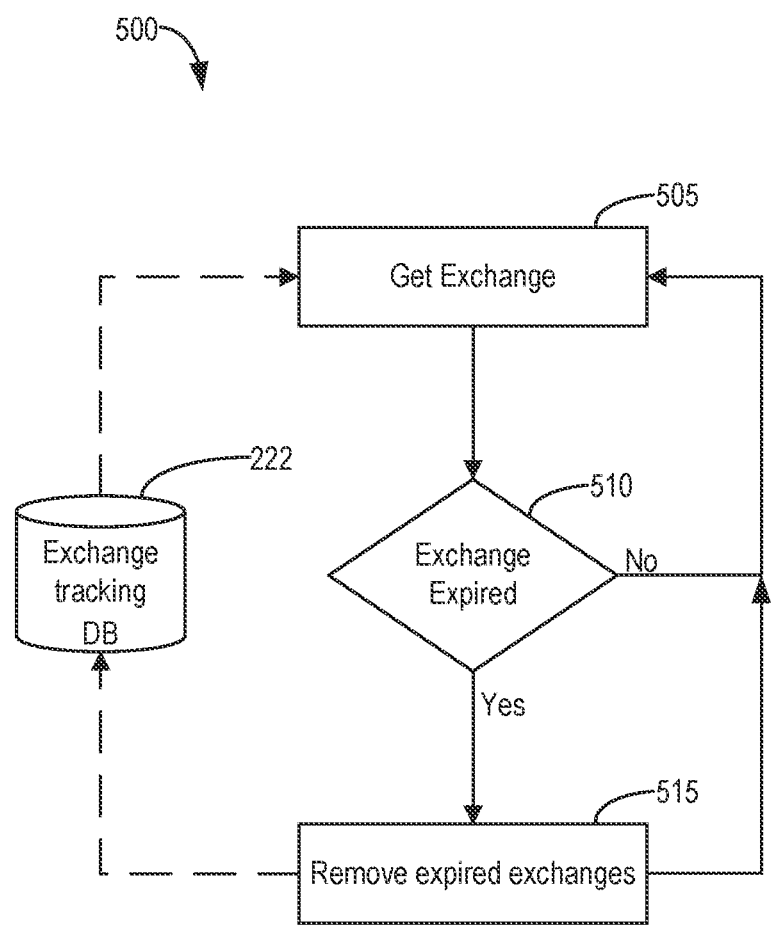
FIG. 5 is an illustration of a flow diagram of a process for encrypted data packet exchange analysis.

FIG. 5 is an illustration of a flow diagram of a process 500 for encrypted data packet exchange analysis, in accordance with an implementation. The process 500 can be performed by a data processing system (the data processing system 110, shown and described with reference to FIG. 1). The process 500 may include more or fewer operations and the operations may be performed in any order. Performance of the process 500 may enable the data processing system to detect one or more network attacks included in encrypted data packet exchanges.

At operation 505, the data processing system gets exchanges. For example, the data processing system may get exchanges that we updated as expired in operation 415. As another example, the data processing system may query the exchange tracking database 222 to identify one or more exchanges that were tagged and/or flagged as being expired. As even another example, the data processing system can look for exchanges that have been completed. In some embodiments, operation 505 may be repeated, reinitiated, and/or executed at one or more time intervals and/or amounts of time. For example, operation 505 may be repeated every hour (e.g., 60 minutes). In some embodiments, operation 505 may be repeated based on network devices. For example, at operation 505, the data processing system may get and/or query the exchange tracking database 222 to receive each exchange associated with a given network device.

At operation 510, the data processing system determines if the exchanges are expired. For example, the data processing system can determine that communication has stopped. As another example, the data processing system can determine that an exchange, from operation 505, includes a tag that indicates the exchange as having expired. The process 500 can proceed to operation 505 responsive to a determination that the exchanges are not expired. The process 500 can proceed to operation 515 responsive to a determination that the exchanges are expired.

At operation 515, the data processing system removes expired exchanges. For example, the data processing system can remove expired exchanges from a cache that is used to track durations for one or more data packet exchanges. As another example, the data processing system can remove expired exchanges by removing them from the exchange tracking database 222. The process 500 can proceed to operation 505 responsive to removing the expired exchanges. For example, the data processing system can query the exchange tracking database 222 for exchanges that correspond to a subsequent network device (e.g., the next network device in a queue).

Figure 6:
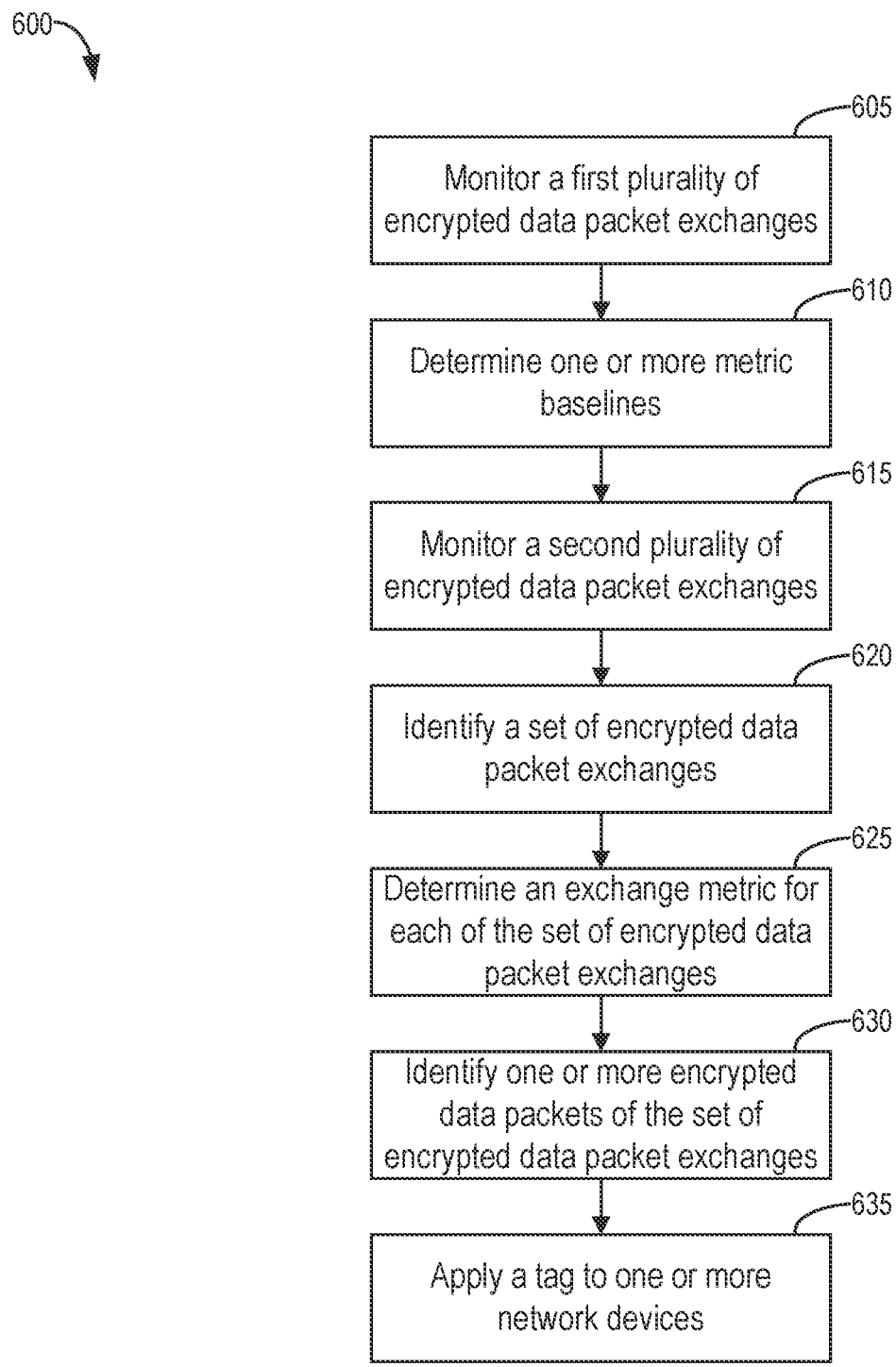
FIG. 6 is a method for encrypted data packet exchange analysis.

FIG. 6 is a method 600 for encrypted data packet exchange analysis, in accordance with an implementation. The method 600 can be performed by one or more system, component or module depicted in FIGS. 1-5 and/or 7A-7C, including, for example, a data processing system or service of a cloud service provider system. The method 600 may include more or fewer operations and the operations may be performed in any order. Performance of the method 600 may enable the data processing system to detect DDOS attacks in encrypted packet exchanges and perform one or more countermeasures to protect against such attacks.

At operation 605, the data processing system monitors encrypted data packet exchanges. The data processing system can monitor first encrypted data packet exchanges between a client and a server. In some embodiments, the data processing system can monitor encrypted data packet exchanges between one or more client devices and one or more service providers. For example, the data processing system can monitor data packets configured with 5-tuples transmitted by the client devices.

At operation 610, the data processing system determines one or more metric baselines. For example, the data processing system can determine metric baselines such as packet count, packet size, inter-packet timing, and/or duration for the packet exchanges. In some embodiments, the data processing system can determine metric baselines for one or more metric types (size, count, duration, etc.) for individual packet exchanges between the server and one or more client devices. The data processing system can update one or more databases (e.g., an exchange tracking database, the metric database 126, etc.) to include the respective one or more metric baselines responsive to determining the metric baselines.

At operation 615, the data processing system monitors one or more second encrypted data packet exchanges. The data processing system can monitor network traffic subsequent to determining the metric baselines in operation 610. As another example, the data processing system may determine metric baselines based on one or more first encrypted data packet exchanges. As another example, the data processing system may determine metric baselines for a given network device based on data packet exchanges transmitted by the given network device. To continue this example, the data processing may then monitor one or more second encrypted data packet exchanges. In some embodiments, the one or more second encrypted data packet exchanges may be between the client devices 106 and the service provider 108.

At operation 620, the data processing system identifies one or more sets of encrypted data packet exchanges. For example, the data processing system can identify sets of encrypted data packet exchanges from the encrypted data packet exchanges monitored in operation 615. As another example, the data processing system can identify sets of encrypted data packet exchanges that have durations exceeding a first threshold. Stated otherwise, the data processing system can identify the encrypted data packet exchanges as short-duration exchanges or long-duration exchanges.

At operation 625, the data processing system determines exchange metrics for the set of encrypted data packet exchanges. For example, the data processing system can determine a mean and a standard deviation for packet counts for a given network device associated with the set of encrypted data packet exchanges. As another example, the data processing system can determine packet size values (e.g., exchange metrics) for the set of encrypted data packet exchanges.

At operation 630, the data processing system identifies one or more encrypted data packet exchanges that exceed a metric baseline. For example, the data processing system can identify encrypted data packet exchanges that have exchange metrics, as determined in operation 625, that exceed the metric baselines determined in operation 610. As another example, the data processing system can identify encrypted data packet exchanges that have a packet size value (e.g., an exchange metric) that exceeds one or more baseline values for packet size. The data processing system can identify encrypted data packet exchanges with any type of metric that exceeds a corresponding metric baseline.

At operation 635, the data processing system applies one or more tags. The data processing system can apply a tag to a network device to identify the network device as malicious. For example, the data processing system can apply a tag to a network device associated with the encrypted data packet exchanges identified in operation 630. In some embodiments, the data processing system can apply one or more tags to network devices to prevent subsequent communication between the server and the malicious network devices (e.g., devices with an applied tag). For example, the data processing system can block the server from communicating with network devices tagged as malicious.

Figure 7A:
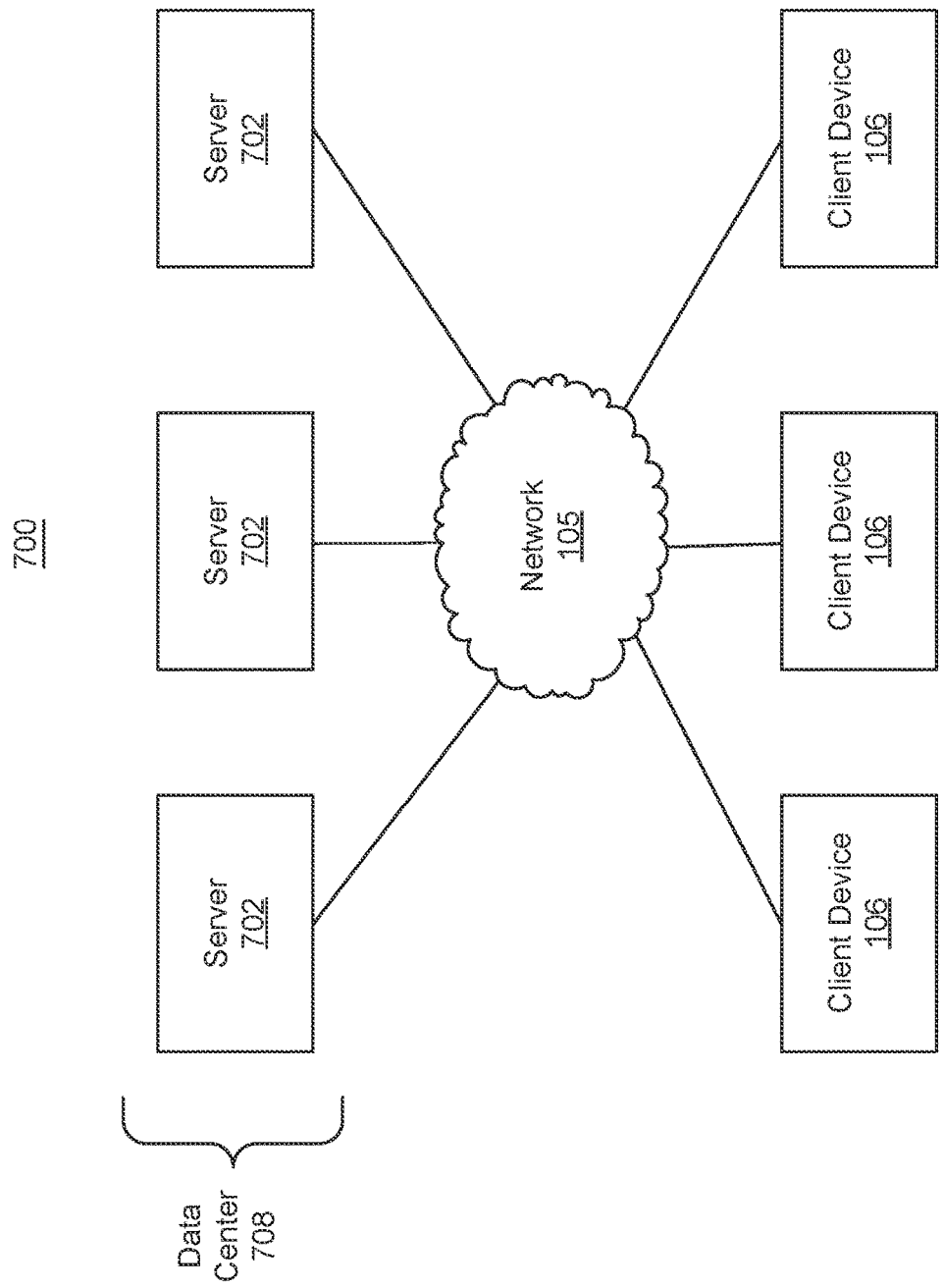
FIG. 7A is a block diagram depicting an implementation of a network environment including a client device in communication with a server device.

FIG. 7A depicts an example network environment that can be used in connection with the methods and systems described herein. In brief overview, the network environment 700 includes one or more client devices 106 (also generally referred to as clients, client node, client machines, client computers, client computing devices, endpoints, or endpoint nodes) in communication with one or more servers 702 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 7A shows a network 105 between the client devices 106 and the servers 702, the client devices 106 and the servers 702 can be on the same network 105. In embodiments, there are multiple networks 105 between the client devices 106 and the servers 702. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 700 can include multiple, logically grouped servers 702. The logical group of servers can be referred to as a data center 708 (or server farm or machine farm). In embodiments, the servers 702 can be geographically dispersed. The data center 708 can be administered as a single entity or different entities. The data center 708 can include multiple data centers 708 that can be geographically dispersed. The servers 702 within each data center 708 can be homogeneous or heterogeneous (e.g., one or more of the servers 702 or machines 702 can operate according to one type of operating system platform (e.g., WINDOWS NT, manufactured by Microsoft Corp. of Redmond, Washington), while one or more of the other servers 702 can operate on according to another type of operating system platform (e.g., Unix, Linux, or Mac OS X)). The servers 702 of each data center 708 do not need to be physically proximate to another server 702 in the same machine farm 708. Thus, the group of servers 702 logically grouped as a data center 708 can be interconnected using a network. Management of the data center 708 can be de-centralized. For example, one or more servers 702 can comprise components, subsystems, and modules to support one or more management services for the data center 708.

Server 702 can be a file server, application server, web server, proxy server, appliance, network appliance, gateway, gateway server, virtualization server, deployment server, SSL VPN server, or firewall. In embodiments, the server 702 can be referred to as a remote machine or a node. Multiple nodes can be in the path between any two communicating servers.

FIG. 7B illustrates an example cloud computing environment. A cloud computing environment 701 can provide client 106 with one or more resources provided by a network environment. The cloud computing environment 701 can include one or more client devices 106, in communication with the cloud 710 over one or more networks 105. Client devices 106 can include, e.g., thick clients, thin clients, and zero clients. A thick client can provide at least some functionality even when disconnected from the cloud 710 or servers 702. A thin client or a zero client can depend on the connection to the cloud 710 or server 702 to provide functionality. A zero client can depend on the cloud 710 or other networks 105 or servers 702 to retrieve operating system data for the client device. The cloud 710 can include back-end platforms, e.g., servers 702, storage, server farms or data centers.

The cloud 710 can be public, private, or hybrid. Public clouds can include public servers 702 that are maintained by third parties to the client devices 106 or the owners of the clients. The servers 702 can be located off-site in remote geographical locations as disclosed above or otherwise. Public clouds can be connected to the servers 702 over a public network. Private clouds can include private servers 702 that are physically maintained by client devices 106 or owners of clients. Private clouds can be connected to the servers 702 over a private network 105. Hybrid clouds can include both the private and public networks 105 and servers 702.

The cloud 710 can also include a cloud-based delivery, e.g., Software as a Service (Saas) 712, Platform as a Service (PaaS) 714, and the Infrastructure as a Service (IaaS) 716. IaaS can refer to a user renting the use of infrastructure resources that are needed during a specified time period. IaaS providers can offer storage, networking, servers, or virtualization resources from large pools, allowing the users to quickly scale up by accessing more resources as needed. PaaS providers can offer functionality provided by IaaS, including, e.g., storage, networking, servers, or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL), DTLS (Datagram Transport Layer Security), or other transmission mechanisms.

The client 106 and server 702 can be deployed as and/or executed on any type and form of computing device, e.g., a computer, network device or appliance capable of communicating on any type and form of network and performing the operations described herein.

Figure 7C:
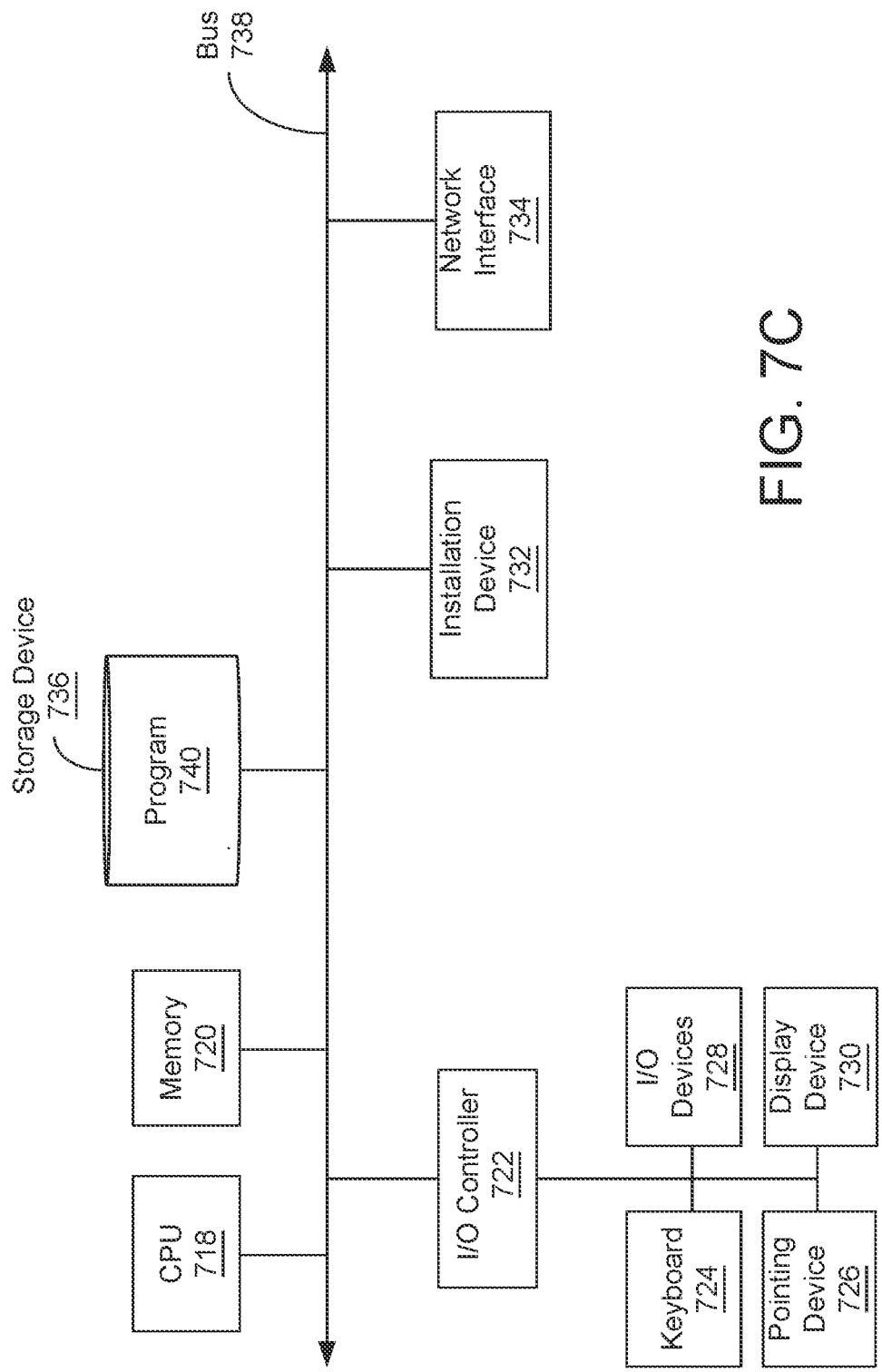
FIG. 7C is a block diagram depicting an implementation of a computing device that can be used in connection with the system depicted in FIG. 1 and the methods and processes depicted in FIGS. 2-6.

FIG. 7C depicts block diagrams of a computing device 703 useful for practicing an embodiment of the client 106 or a server 702. As shown in FIG. 7C, each computing device 703 can include a central processing unit 718, and a main memory unit 720. As shown in FIG. 7C, a computing device 703 can include one or more of a storage device 736, an installation device 732, a network interface 734, an I/O controller 722, a display device 730, a keyboard 724 or a pointing device 726, e.g., a mouse. The storage device 736 can include, without limitation, a program 740, such as an operating system, software, or software associated with system 100.

The central processing unit 718 is any logic circuitry that responds to and processes instructions fetched from the main memory unit 720. The central processing unit 718 can be provided by a microprocessor unit, e.g.: those manufactured by Intel Corporation of Mountain View, California. The computing device 703 can be based on any of these processors, or any other processor capable of operating as described herein. The central processing unit 718 can utilize instruction level parallelism, thread level parallelism, different levels of cache, and multi-core processors. A multi-core processor can include two or more processing units on a single computing component.

Main memory unit 720 can include one or more memory chips capable of storing data and allowing any storage location to be directly accessed by the microprocessor 718. Main memory unit 720 can be volatile and faster than storage 736 memory. Main memory units 720 can be Dynamic random-access memory (DRAM) or any variants, including static random access memory (SRAM). The memory 720 or the storage 736 can be non-volatile; e.g., non-volatile read access memory (NVRAM). The memory 720 can be based on any type of memory chip, or any other available memory chips. In the example depicted in FIG. 7C, the processor 718 can communicate with memory 720 via a system bus 738.

A wide variety of I/O devices 728 can be present in the computing device 703. Input devices 728 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 728 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 728, display devices 730 or group of devices can be augmented reality devices. The I/O devices can be controlled by an I/O controller 722 as shown in FIG. 7C. The I/O controller 722 can control one or more I/O devices, such as, e.g., a keyboard 724 and a pointing device 726, e.g., a mouse or optical pen. Furthermore, an I/O device can also provide storage and/or an installation device 732 for the computing device 703. In embodiments, the computing device 703 can provide USB connections (not shown) to receive handheld USB storage devices. In embodiments, an I/O device 728 can be a bridge between the system bus 738 and an external communication bus, e.g., a USB bus, a SCSI bus, a FireWire bus, an Ethernet bus, a Gigabit Ethernet bus, a Fibre Channel bus, or a Thunderbolt bus.

In embodiments, display devices 730 can be connected to I/O controller 722. Display devices can include, e.g., liquid crystal displays (LCD), electronic papers (e-ink) displays, flexile displays, light emitting diode displays (LED), or other types of displays. In some embodiments, display devices 730 or the corresponding I/O controllers 722 can be controlled through or have hardware support for OPENGL or DIRECTX API or other graphics libraries. Any of the I/O devices 728 and/or the I/O controller 722 can include any type and/or form of suitable hardware, software, or combination of hardware and software to support, enable or provide for the connection and use of one or more display devices 730 by the computing device 703. For example, the computing device 703 can include any type and/or form of video adapter, video card, driver, and/or library to interface, communicate, connect, or otherwise use the display devices 730. In embodiments, a video adapter can include multiple connectors to interface to multiple display devices 730.

The computing device 703 can include a storage device 736 (e.g., one or more hard disk drives or redundant arrays of independent disks) for storing an operating system or other related software, and for storing application software programs 740 such as any program related to the systems, methods, components, modules, elements, or functions depicted in FIG. 1. Examples of storage device 736 include, e.g., hard disk drive (HDD); optical drive including CD drive, DVD drive, or BLU-RAY drive; solid-state drive (SSD); USB flash drive; or any other device suitable for storing data. Storage devices 736 can include multiple volatile and non-volatile memories, including, e.g., solid state hybrid drives that combine hard disks with solid state cache. Storage devices 736 can be non-volatile, mutable, or read-only. Storage devices 736 can be internal and connect to the computing device 703 via a bus 738. Storage device 736 can be external and connect to the computing device 703 via an I/O device 730 that provides an external bus. Storage device 736 can connect to the computing device 703 via the network interface 734 over a network 105. Some client devices 106 may not require a non-volatile storage device 736 and can be thin clients or zero client devices 106. Some storage devices 736 can be used as an installation device 732 and can be suitable for installing software and programs.

The computing device 703 can include a network interface 734 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 703 can communicate with other computing devices 702 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 734 can include a built-in network adapter, network interface card, PCMCIA network card, EXPRESSCARD network card, card bus network adapter, wireless network adapter, USB network adapter, modem, or any other device suitable for interfacing the computing device 703 to any type of network capable of communication and performing the operations described herein.

A computing device 703 of the sort depicted in FIG. 7C can operate under the control of an operating system, which controls scheduling of tasks and access to system resources. The computing device 703 can be running any operating system configured for any type of computing device, including, for example, a desktop operating system, a mobile device operating system, a tablet operating system, or a smartphone operating system.

The computing device 703 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 703 has sufficient processor power and memory capacity to perform the operations described herein. In some embodiments, the computing device 703 can have different processors, operating systems, and input devices consistent with the device.

In embodiments, the status of one or more machines 106, 703 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 703 in response to the CPU 718 executing an arrangement of instructions contained in main memory 720. Such instructions can be read into main memory 720 from another computer-readable medium, such as the storage device 736. Execution of the arrangement of instructions contained in main memory 720 causes the computing device 703 to perform the illustrative processes described herein. One or more processors in a multi-processing arrangement may also be employed to execute the instructions contained in main memory 720. Hard-wired circuitry can be used in place of or in combination with software instructions together with the systems and methods described herein. Systems and methods described herein are not limited to any specific combination of hardware circuitry and software.

Although an example computing system has been described in FIG. 7A, the subject matter including the operations described in this specification can be implemented in other types of digital electronic circuitry, or in computer software, firmware, or hardware, including the structures disclosed in this specification and their structural equivalents, or in combinations of one or more of them.

At least one aspect is directed to a system. The system can include a network monitoring device. The network monitoring device can be connected to a communications network. The network device can monitor network transmitted to and from a server across the communications network. The network monitoring device can include one or more processors coupled with memory. The memory can store instructions thereon. The instructions can cause, when executed by the one or more processors, the one or more processors to monitor a first plurality of encrypted data packet exchanges between the server and a plurality of network devices. The instructions can cause, when executed by the one or more processors, the one or more processors to determine, based at least on the first plurality of encrypted data packet exchanges, one or more metric baselines corresponding to a plurality of metric types for communication between the server and the plurality of network devices. The instructions can cause, when executed by the one or more processors, the one or more processors to monitor, subsequent to the determination of the one or more metric baselines, a second plurality of encrypted data packet exchanges between the server and a second plurality of network devices. The instructions can cause, when executed by the one or more processors, the one or more processors to identify a set of encrypted data packet exchanges from the second plurality of encrypted data packet exchanges each having a duration exceeding a first threshold. The instructions can cause, when executed by the one or more processors, the one or more processors to determine an exchange metric for each of the plurality of metric types for each of the set of encrypted data packet exchanges. The instructions can cause, when executed by the one or more processors, the one or more processors to identify one or more encrypted data packet exchanges of the set of encrypted data packet exchanges having at least one exchange metric exceeding a metric baseline of the one or more metric baselines of the same metric type. The instructions can cause, when executed by the one or more processors, the one or more processors to apply a tag to one or more network devices of the second plurality of network devices associated with the identified one or more encrypted data packet exchanges identifying the one or more network devices as malicious.

At least one aspect is directed to a method. The method can include monitoring, by one or more processors, a first plurality of encrypted data packet exchanges between a server and a plurality of network devices. The one or more processors can be connected to a communications network, and the one or more processors can monitor network traffic transmitted to and from the server across the communications network. The method can include determining, by the one or more processors based at least on the first plurality of encrypted data packet exchanges, one or more metric baselines corresponding to a plurality of metric types for communication between the server and the plurality of network devices. The method can include monitoring, by the one or more processors subsequent to the determination of the one or more metric baselines, a second plurality of encrypted data packet exchanges between the server and a second plurality of network devices. The method can include identifying, by the one or more processors, a set of encrypted data packet exchanges from the second plurality of encrypted data packet exchanges each having a duration exceeding a first threshold. The method can include determining, by the one or more processors, an exchange metric for each of the plurality of metric types for each of the set of encrypted data packet exchanges. The method can include identifying, by the one or more processors, one or more encrypted data packet exchanges of the set of encrypted data packet exchanges having at least one exchange metric exceeding a metric baseline of the one or more metric baselines of the same metric type. The method can include applying, by the one or more processors, a tag to one or more network devices of the second plurality of network devices associated with the identified one or more encrypted data packet exchanges identifying the one or more network devices as malicious.

At least one aspect is directed to a non-transitory computer readable storage medium. The non-transitory computer readable storage medium can include instructions stored thereon. The instructions can cause, when executed by one or more processors, the one or more processors to monitor a first plurality of encrypted data packet exchanges between a server and a plurality of network devices. The one or more processors can be connected to a communications network, and the one or more processors can monitor network traffic transmitted to and from the server across the communications network. The instructions can cause the one or more processors to determine, based at least on the first plurality of encrypted data packet exchanges, one or more metric baselines corresponding to a plurality of metric types for communication between the server and the plurality of network devices. The instructions can cause the one or more processors to monitor, subsequent to the determination of the one or more metric baselines, a second plurality of encrypted data packet exchanges between the server and a second plurality of network devices. The instructions can cause the one or more processors to identify a set of encrypted data packet exchanges from the second plurality of encrypted data packet exchanges each having a duration exceeding a first threshold. The instructions can cause the one or more processors to determine an exchange metric for each of the plurality of metric types for each of the set of encrypted data packet exchanges. The instructions can cause the one or more processors to identify one or more encrypted data packet exchanges of the set of encrypted data packet exchanges having at least one exchange metric exceeding a metric baseline of the one or more metric baselines of the same metric type. The instructions can cause the one or more processors to apply a tag to one or more network devices of the second plurality of network devices associated with the identified one or more encrypted data packet exchanges identifying the one or more network devices as malicious.

The foregoing detailed description includes illustrative examples of various aspects and embodiments and provides an overview or framework for understanding the nature and character of the claimed aspects and embodiments. The drawings provide illustration and a further understanding of the various aspects and embodiments and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all embodiments, and the described program components can be included in a single hardware or software product.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any implementation or element or act herein may also embrace embodiments including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system comprising:
    a network monitoring device connected to a communications network, the network monitoring device configured to monitor network traffic transmitted to and from a server across the communications network, the network monitoring device comprising one or more processors coupled with memory, the memory storing executable instructions that, when executed by the one or more processors, cause the one or more processors to:
        monitor a first plurality of encrypted data packet exchanges between the server and a plurality of network devices;
        determine, based at least on the first plurality of encrypted data packet exchanges, one or more metric baselines corresponding to a plurality of metric types for communication between the server and the plurality of network devices;
        monitor, subsequent to the determination of the one or more metric baselines, a second plurality of encrypted data packet exchanges between the server and a second plurality of network devices;
        identify a set of encrypted data packet exchanges from the second plurality of encrypted data packet exchanges each having a duration exceeding a first threshold;
        determine an exchange metric for each of the plurality of metric types for each of the set of encrypted data packet exchanges;
        identify one or more encrypted data packet exchanges of the set of encrypted data packet exchanges having at least one exchange metric exceeding a metric baseline of the one or more metric baselines of the same metric type; and
        apply a tag to one or more network devices of the second plurality of network devices associated with the identified one or more encrypted data packet exchanges identifying the one or more network devices as malicious.

2. The system of claim 1, wherein the one or more metric baselines correspond to least one of:
    a plurality of data packet sizes associated with the first plurality of encrypted data packet exchanges; or
    a plurality of inter-packet timings associated with the first plurality of encrypted data packet exchanges.

3. The system of claim 1, wherein the instructions cause the one or more processors to:
    identify a second set of encrypted data packet exchanges from the second plurality of encrypted data packet exchanges, the second set of encrypted data packet exchanges corresponding to a second network device of the second plurality of network devices;
    determine, responsive to the identification of the second set of encrypted data packet exchanges, one or more second exchange metrics associated with the second set of encrypted data packet exchanges, the one or more second exchange metrics comprising:
        a number of long-duration encrypted data packet exchanges included in the second set of encrypted data packet exchanges; or
        a number of short-duration encrypted data packet exchanges included in the second set of encrypted data packet exchanges; and
    apply, based at least on the number of long-duration encrypted data packet exchanges or the number of short-duration encrypted data packet exchanges, a second tag to the second network device to identify the second network device as malicious.

4. The system of claim 3, wherein the instructions cause the one or more processors to:
    transmit, responsive to application of the second tag to the second network device, a signal to a computing device, the computing device configured to decrypt the second set of encrypted data packet exchanges to identify given information included in the second set of encrypted data packet exchanges;
    prevent, responsive to decryption of the second set of encrypted data packet exchanges by the computing device, subsequent data packet exchanges between the server and the second network device; and
    compare the one or more second exchange metrics with one or more third exchange metrics of a third set of encrypted data packet exchanges from the second plurality of encrypted data packet exchanges to identify one or more third network devices of the second plurality of network devices as malicious.

5. The system of claim 3, wherein the instructions cause the one or more processors to prevent subsequent data packet exchanges between the server and the second network device identified as malicious.

6. The system of claim 1, wherein the instructions cause the one or more processors to:
   determine, responsive to monitoring the second plurality of encrypted data packet exchanges, an amount of time elapsed between a first given encrypted data packet exchange of the second plurality of encrypted data packet exchanges and a second given encrypted data packet exchange of the second plurality of encrypted data packet exchanges, the first given encrypted data packet exchange and the second given encrypted data packet exchange associated with a given network device of the second plurality of network devices;
   detect, responsive to determination of the amount of time, that the amount of time is less than a predetermined amount; and
   apply, based on the amount of time being less than the predetermined amount, a second tag to the given network device to identify the given network device as malicious.

7. The system of claim 1, wherein the instructions cause the one or more processors to:
   identify, responsive to decryption of the identified one or more encrypted data packet exchanges by a computing device, a network attack attempted by the network device.

8. The system of claim 1, wherein the instructions cause the one or more processors to:
   retrieve, from a data structure, information associated with a given network device of the second plurality of network devices;
   determine, responsive to retrieval of the information associated with the given network device, one or more second exchange metrics associated with a second set of encrypted data packet exchanges from the second plurality of encrypted data packet exchanges, the second set of encrypted data packet exchanges corresponding to the given network device; and
   apply, responsive to determination of the one or more second exchange metrics, a second tag to the given network device to identify the given network device as malicious.

9. The system of claim 8, wherein the one or more second exchange metrics comprise at least one of:
   a number of short-duration encrypted data packet exchanges included in the second set of encrypted data packet exchanges;
   a number of long-duration encrypted data packet exchanges included in the second set of encrypted data packet exchanges; or
   an amount of time associated with the second set of encrypted data packet exchanges.

10. The system of claim 1, wherein the instructions cause the one or more processors to:
    identify one or more second encrypted data packet exchanges of the set of encrypted data packet exchanges as one or more short-duration encrypted data packet exchanges;
    update, responsive to identification of the one or more short-duration encrypted data packet exchanges, a data structure to identify the one or more second encrypted data packet exchanges as the one or more short-duration encrypted data packet exchanges;
    detect, responsive to updating the data structure, that a number of short-duration encrypted data packet exchanges associated with the one or more network devices exceed a predetermined threshold; and
    apply, responsive to detection that the number of short-duration encrypted data packet exchanges exceeds the predetermined threshold, the tag to the one or more network devices to identify the one or more network devices as malicious.

11. The system of claim 1, wherein instructions cause the one or more processors to:
    identify the one or more encrypted data packet exchanges as one or more long-duration encrypted data packet exchanges;
    update, responsive to identification of the one or more long-duration encrypted data packet exchanges, a data structure to identify the one or more encrypted data packet exchanges as the one or more long-duration encrypted data packet exchanges;
    detect, responsive to updating the data structure, that one or more second exchange metrics associated with the one or more long-duration encrypted data packet exchanges are different from the one or more metric baselines; and
    apply, responsive to detection that the one or more second exchange metrics are different form the one or more metric baselines, the tag to the one or more network devices to identify the one or more network devices as malicious.

12. The system of claim 1, wherein the first plurality of encrypted data packet exchanges comprise at least one of one or more short-duration encrypted data packet exchanges or one or more long-duration encrypted data packet exchanges, and wherein the one or more short-duration encrypted data packet exchanges occur in less than 500 milliseconds.

13. A method, comprising:
    monitoring, by one or more processors, a first plurality of encrypted data packet exchanges between a server and a plurality of network devices, the one or more processors connected to a communications network, and the one or more processors configured to monitor network traffic transmitted to and from the server across the communications network;
    determining, by the one or more processors based at least on the first plurality of encrypted data packet exchanges, one or more metric baselines corresponding to a plurality of metric types for communication between the server and the plurality of network devices;
    monitoring, by the one or more processors subsequent to the determination of the one or more metric baselines, a second plurality of encrypted data packet exchanges between the server and a second plurality of network devices;
    identifying, by the one or more processors, a set of encrypted data packet exchanges from the second plurality of encrypted data packet exchanges each having a duration exceeding a first threshold;
    determining, by the one or more processors, an exchange metric for each of the plurality of metric types for each of the set of encrypted data packet exchanges;
    identifying, by the one or more processors, one or more encrypted data packet exchanges of the set of encrypted data packet exchanges having at least one exchange metric exceeding a metric baseline of the one or more metric baselines of the same metric type; and
    applying, by the one or more processors, a tag to one or more network devices of the second plurality of network devices associated with the identified one or more encrypted data packet exchanges identifying the one or more network devices as malicious.

14. The method of claim 13, wherein the one or more metric baselines comprise at least one of:
   a plurality of data packet sizes associated with the first plurality of encrypted data packet exchanges; or
   a plurality of inter-packet timings associated with the first plurality of encrypted data packet exchanges.

15. The method of claim 13, further comprising:
   identifying, by the one or more processors, a second set of encrypted data packet exchanges from the second plurality of encrypted data packet exchanges, the second set of encrypted data packet exchanges corresponding to a second network device of the second plurality of network devices;
   determining, by the one or more processors responsive to identifying the second set of encrypted data packet exchanges, one or more second exchange metrics associated with the second set of encrypted data packet exchanges, the one or more second exchange metrics comprising:
      a number of long-duration encrypted data packet exchanges included in the second set of encrypted data packet exchanges; or
      a number of short-duration encrypted data packet exchanges included in the second set of encrypted data packet exchanges; and
   applying, by the one or more processors based at least on the number of long-duration encrypted data packet exchanges or the number of short-duration encrypted data packet exchanges, a second tag to the second network device to identify the second network device as malicious.

16. The method of claim 15, further comprising:
   transmitting, by the one or more processors responsive to application of the second tag to the second network device, a signal to a computing device, the computing device configured to decrypt the second set of encrypted data packet exchanges to identify given information included in the second set of encrypted data packet exchanges;
   preventing, by the one or more processors responsive to decryption of the second set of encrypted data packet exchanges by the computing device, subsequent data packet exchanges between the server and the second network device; and
   comparing, by the one or more processors, the one or more second exchange metrics with one or more third exchange metrics of a third set of encrypted data packet exchanges from the second plurality of encrypted data packet exchanges to identify one or more third network devices of the second plurality of network devices as malicious.

17. The method of claim 15, further comprising:
   preventing, by the one or more processors, subsequent data packet exchanges between the server and the second network device identified as malicious.

18. The method of claim 13, further comprising:
   determining, by the one or more processors responsive to monitoring the second plurality of encrypted data packet exchanges, an amount of time elapsed between a first given encrypted data packet exchange of the second plurality of encrypted data packet exchanges and a second given encrypted data packet exchange of the second plurality of encrypted data packet exchanges, the first given encrypted data packet exchange and the second given encrypted data packet exchange associated with a given network device of the second plurality of network devices;
   detecting, by the one or more processors responsive to determination of the amount of time, that the amount of time is less than a predetermined amount; and
   applying, by the one or more processors based on the amount of time being less than the predetermined amount, a second tag to the given network device to identify the given network device as malicious.

19. A non-transitory computer readable storage medium comprising instructions stored thereon that, when executed by one or more processors, cause the one or more processors to:
   monitor a first plurality of encrypted data packet exchanges between a server and a plurality of network devices, the one or more processors connected to a communications network, and the one or more processors configured to monitor network traffic transmitted to and from the server across the communications network;
   determine, based at least on the first plurality of encrypted data packet exchanges, one or more metric baselines corresponding to a plurality of metric types for communication between the server and the plurality of network devices;
   monitor, subsequent to the determination of the one or more metric baselines, a second plurality of encrypted data packet exchanges between the server and a second plurality of network devices;
   identify a set of encrypted data packet exchanges from the second plurality of encrypted data packet exchanges each having a duration exceeding a first threshold;
   determine an exchange metric for each of the plurality of metric types for each of the set of encrypted data packet exchanges;
   identify one or more encrypted data packet exchanges of the set of encrypted data packet exchanges having at least one exchange metric exceeding a metric baseline of the one or more metric baselines of the same metric type; and
   apply a tag to one or more network devices of the second plurality of network devices associated with the identified one or more encrypted data packet exchanges identifying the one or more network devices as malicious.

20. The non-transitory computer readable storage medium of claim 19, wherein the instructions further cause the one or more processors to:
   identify a second set of encrypted data packet exchanges from the second plurality of encrypted data packet exchanges, the second set of encrypted data packet exchanges corresponding to a second network device of the second plurality of network devices;
   determine, responsive to the identification of the second set of encrypted data packet exchanges, one or more second exchange metrics associated with the second set of encrypted data packet exchanges, the one or more second exchange metrics comprising:
      a number of long-duration encrypted data packet exchanges included in the second set of encrypted data packet exchanges; or
      a number of short-duration encrypted data packet exchanges included in the second set of encrypted data packet exchanges; and
   apply, based at least on the number of long-duration encrypted data packet exchanges or the number of short-duration encrypted data packet exchanges, a second tag to the second network device to identify the second network device as malicious.

* * * * *